United States Patent
Strauss et al.

(10) Patent No.: US 8,326,917 B2
(45) Date of Patent: Dec. 4, 2012

(54) METHOD AND APPARATUS FOR IDENTIFYING AN ALTERNATIVE PEER HOSTING AN ALTERNATIVE COMMUNICATION SERVICE

(75) Inventors: Thomas Strauss, Esslingen (DE); Marco Tomsu, Ditzingen (DE); Marc Drewniok, Stuttgart (DE)

(73) Assignee: Alcatel Lucent, Paris (FR)

( * ) Notice: Subject to any disclaimer, the term of this patent is extended or adjusted under 35 U.S.C. 154(b) by 344 days.

(21) Appl. No.: 12/133,117

(22) Filed: Jun. 4, 2008

(65) Prior Publication Data
US 2008/0313279 A1     Dec. 18, 2008

(30) Foreign Application Priority Data
Jun. 18, 2007     (EP) ..................... 07301123

(51) Int. Cl.
  *G06F 15/16*     (2006.01)
(52) U.S. Cl. ......... 709/203; 709/202; 709/204; 709/226
(58) Field of Classification Search .......... 709/202–205, 709/208, 223–226
See application file for complete search history.

(56) References Cited

U.S. PATENT DOCUMENTS

| | | | |
|---|---|---|---|
| 6,332,163 B1 * | 12/2001 | Bowman-Amuah | 709/223 |
| 7,117,250 B1 * | 10/2006 | Wu | 709/203 |
| 7,185,058 B2 * | 2/2007 | Blackwell et al. | 709/202 |
| 7,542,944 B1 * | 6/2009 | Drummond et al. | 705/43 |
| 7,577,705 B2 * | 8/2009 | Schwartz et al. | 709/203 |
| 7,584,265 B2 * | 9/2009 | Dickerman et al. | 709/204 |
| 7,945,618 B2 * | 5/2011 | Asher | 709/204 |
| 2002/0147810 A1 | 10/2002 | Traversat | |
| 2003/0050966 A1 | 3/2003 | Dutta | |
| 2003/0105812 A1 * | 6/2003 | Flowers et al. | 709/203 |
| 2003/0182421 A1 * | 9/2003 | Faybishenko et al. | 709/224 |

FOREIGN PATENT DOCUMENTS

| | | |
|---|---|---|
| EP | 1633111 A1 | 3/2006 |
| EP | 2006117288 A1 | 11/2006 |
| EP | 1760989 A1 | 3/2007 |
| WO | 2005009019 A2 | 1/2005 |
| WO | 2007008567 A1 | 1/2007 |
| WO | 2007057633 A1 | 5/2007 |

OTHER PUBLICATIONS

Bryan et al, "SOSIMPLE: A Serverless, Standards-based, P2P SIP Communication System", Advanced Architectures and Algorithms for Internet Delivery and Applications, 2005. AAA-Idea 2006. First International Workshop, Orlando, FL, Jun. 15, 2005, IEEE, Jun. 15, 2005, pp. 42-49, XP010927626.

* cited by examiner

*Primary Examiner* — Bharat N Barot
(74) *Attorney, Agent, or Firm* — Fay Sharpe, LLP (57) ABSTRACT

The application concerns a method for invoking a communication service that is realized by means of a peer of a peer-to-peer system, the method comprising the step of identifying a peer hosting the communication service and invoking the communication service by means of a distributed directory, where the distributed directory carrying entries that enable a client to invoke the communication service, the method further comprising the step of identifying an alternative peer hosting an alternative communication service in case the identified peer or the communication service is unavailable, where the distributed directory carrying entries that enable a client to invoke the alternative communication service. And the application concerns a computer software product and a telecommunication system for providing communication services corresponding to the method.

16 Claims, 13 Drawing Sheets

METHOD AND APPARATUS FOR IDENTIFYING AN ALTERNATIVE PEER HOSTING AN ALTERNATIVE COMMUNICATION SERVICE

BACKGROUND OF THE INVENTION

The invention is based on a priority application EP 07301123.1 which is hereby incorporated by reference.

This application concerns a method for invoking a communication service that is realized by means of a peer of a peer-to-peer system, a software product and a telecommunication system therefor.

Lowest operational expenditure conversational and collaboration/community services over Internet and overlay networks like voice or multimedia conferencing, instant messaging, push-to-talk, or any kind of information sharing for carriers like internet service providers, network service providers or even telecommunication service providers is highly demanded.

This target is reached by minimum centralized infrastructure like peer-to-peer networks need the ability to provide, find and starting value added services. For massively used services like TeleVoting with a high end server in back or often used services like voice-mailbox which need a long online time it is not possible to deploy them in such low cost networks, as there are no automatism and mechanisms defined yet to deploy and integrate them.

In this domain the International Patent Application No. WO 2005/009019 discloses a peer-to-pee telephone system comprising a plurality of identical end-users and a communication structure through which one or more end-users are connectable for communication purposes. This system is distinguished in that the communication structure is substantially de-centralized with regard to communication route switching therein for connecting said one or more end-users.

Peer-to-peer (P2P) computing promises to be the paradigm with mindshare sufficient to push a number of interesting distributed computing technologies from the shadows into the spotlight.

The use of P2P computing is not limited to decentralize communication clients as in WO 2005/009019. P2P is beginning to look like the paradigm with a large enough slice of mindshare to move a number of promising technologies from the wings into the limelight. Peer-to-peer computing didn't spring into existence in its current form. Rather, it is the child of a number of different parents. First and most important, P2P computing is the natural result of decentralizing trends in software engineering intersecting with available technology. From an engineering perspective, the trend over the last decade, driven by forces such as enterprise application integration, has clearly been away from monolithic systems and toward distributed systems. This trend was inhibited somewhat by the ease of managing centralized applications, but the growth of the Internet, followed by the rise in importance of business to business transactions, made full-scale distributed computing a business necessity. Intersecting this trend is the growth in the availability of powerful networked computers and inexpensive bandwidth. To be effective, P2P computing requires the availability of numerous, interconnected peers.

P2P computing is a subset of distributed computing. The name "peer-to-peer" suggests an egalitarian relationship between peers and, more importantly, suggests direct interactions between peers. P2P applications consist of a number of peers, each performing a specific role in the P2P network, in communication with each other. Typically, the number of peers is large and the number of different roles is small. These two factors explain why most P2P applications are characterized by massive parallelization in function. The best example is the Gnutella network, which consists of a large number of essentially identical peers. In P2P applications, the interesting problems lie in the interaction between the peers and, to a lesser extent, in the peers themselves.

SUMMARY OF THE INVENTION

The problems to be solved by P2P computing overlap to a considerable degree with the problems faced in distributed computing—coordinating and monitoring the activities of independent nodes and ensuring robust, reliable communication between nodes.

An overview of P2P technique is given by http://www.webopedia.com/DidYouKnow/Internet/2005/peer to peer.asp or by http://en.wikipedia.org/wiki/Peer-to-peer. The central problem of resource resolution is for instant is dealt in the U.S. Pat. No. 7,136,927.

Technical problem that has to be solved is to realize the initially mentioned highly reliable telecommunication infrastructure with less infrastructure dedicated hardware components by means of peer-to-peer techniques.

This problem is solved by a method for invoking a communication service that is realized by means of a peer of a peer-to-peer system. The method comprising the step of identifying a peer hosting the communication service and invoking the communication service by means of a distributed directory, where the distributed directory is carrying entries that enable a client to invoke the communication service. And the method comprises the further step of identifying an alternative peer hosting an alternative communication service in case the identified peer or the communication service is unavailable, where the distributed directory also carries entries that enable a client to invoke the alternative communication service.

The problem is solved inter alia by a computer software product for providing communication services that are realized by means of a peer of a peer-to-peer programming means, where the peer-to-peer programming means comprising a distributed directory for identifying a peer hosting a communication service and where the peer-to-peer programming means comprising communication means for invoking the communication service, where the distributed directory carrying entries that enable a client to invoke the communication service, where the peer-to-peer programming means comprising identification means for identifying an alternative peer hosting an alternative communication service in case the peer or the communication service is unavailable, where the distributed directory carrying entries that enable a client to invoke the alternative communication service.

And the problem is solved by a telecommunication system for providing communication services that are realized by means of a peer of a peer-to-peer programming means, where the peer-to-peer programming means comprising a distributed directory for identifying a peer hosting a communication service and where the peer-to-peer programming means comprising communication means for invoking the communication service, where the distributed directory carrying entries that enable a client to invoke the communication service, where the peer-to-peer programming means comprising identification means for identifying an alternative peer hosting an alternative communication service in case the peer or the communication service is unavailable, where the distributed directory carrying entries that enable a client to invoke the alternative communication service.

It is also noticed that a main part of the solution is a telecommunication service system providing a communication service that is realized by means of a peer of a peer-to-peer programming means, where the peer-to-peer programming means comprising a distributed directory for identifying a peer hosting a communication service and where the peer-to-peer programming means comprising communication means for invoking the communication service, where the distributed directory carrying entries that enable a client to invoke the communication service, where the peer-to-peer programming means comprising identification means for identifying an alternative peer hosting an the alternative communication service in case the peer or the communication service is unavailable, where the distributed directory carrying entries that enable a client to invoke the alternative communication service.

In other words the main idea is to re-use the distributed dictionary of a peer-to-peer platform to select alternative services. That means that a distributed hashing technique is used for locating and selecting a service and reusing the build in redundancy mechanisms as fallback for a service allocation. This could be done without deep modifications of the underlying data structure, since only entries, i.e. resource identifiers, are augmented. Usually such a data structure maintains redundancy resources for a service. This basic principle is broken and instead of the redundancy peer an alternative peer providing an alternative service is identified. This is a mix-up between routing protocol and service invocation.

This approach has several advantages. The main feature is the simple and reliable services provision by means of a peer-to-peer network. Service peers enhance peer-to-peer networks for distinguished service fallback chains.

To implement such a peer-to-peer service control structure requires no additional network resources. Peer nodes and algorithms of the peer-to-peer network can be easily re-used for topics like backup, redundancy, and reliability. That allows service providers to reduce operational expenditure and capital expenditures for service infrastructure.

Technically the network resources will be used more efficient through the distributed directory.

Administratively, service providers can easily introduce and provide services in peer-to-peer networks. Service peers enhance peer-to-peer networks for users who want to have special services, e.g. voice mailbox in a voice over Internet protocol system. Service providers do not need additional network resources. At least is a service provider enabled to add dedicated resources at the suitable locations of the peer-to-peer routing topology, so that they can be invoked as alternative service. They can still reuse peer nodes and mechanisms and algorithms of the peer-to-peer network for topics like backup, redundancy and reliability.

BRIEF DESCRIPTION OF THE DRAWINGS

The invention will be described by example using a Chord topology but can be realized using any directory mechanism.

FIGS. 10, 11, 12 and 13 show a forwarding scenario by means of a moved temporarily signaling in a telecommunication system according to the invention Today's automatisms and mechanisms are based on central instances, which are called when a peer wants to have and use services. State of the art for a service-oriented architecture is first to lookup at a central service directory, like a universal-description-discovery-and-integration (UDDI), and second to invoke the service at a server of the service provider.

There are no distribution mechanisms besides the service hosting like the dictionaries of a peer-to-peer network. In today's telecommunication networks there is usually a central lookup instances and central service instances to provide, find and invoke services. Central instances need a suited maintenance concept with topics like redundancy, reliability, etc.

To get rid of such topics it is advantageous to distribute these instances in a structured peer-to-peer network. Therefore it needs to introduce mechanisms and automatisms to provide, find and invoke services and service chains. Hence a service provider needn't to look for own-hosted central service instances. Services are automatically integrated in the peer-to-peer network and inherent redundancy and reliability concepts and mechanisms can be used.

The deployment of so-called value added services enhance the use of peer-to-peer networks and is of great interest of a service provider. For example in a voice over Internet protocol telephone network it is essential to have a voice mailbox or other supplementary services, see http://de.wikipedia.org/wiki/Vermittlungstechnische_Leistungsmerkmale.

A so-called service peer, i.e. a peer hosting a service, introduces such value added services in peer-to-peer networks. The service peer is an instance where the services are provided and run. Services are for example to represent the user with a voice mailbox if the user is offline, or to decide which instance of a user should be called and therefore where should the call be routed.

This service peer gets the position in the peer-to-peer topology, e.g. in a Chord ring, where also the backup of a user runs—preferably as a backup or redundancy peer. The illustrated examples use the Chord algorithm, where a redundancy peer, i.e. the peer suited to host an alternative service, also known as the service peer, is located previous to the node for which the service should run.

In other structured peer-to-peer networks the service peer might be located somewhere else, but preferably at the position where usually a backup of nodes is located. These positions in the ring are responsible for redundancy information and therefore automatically responsible if a node or user crashes or disappears.

An additional alternative service could exchange user and service information in place of a requested service invocation. A service peer detects itself when a service should be started. A caller, i.e. a client or a peer in a client role, intents to invoke a dedicated service. This service, or to be more precise, a description of that service, is used to look up and identify the peer hosting this service. If the identified peer disappears another, a so-called redundancy peer is usually identified for providing this service; or the service invocation is simply denied. In such a situation, when an identified peer has become invalid, according to the invention another alternative service is offered. The peer-to-peer system is able to recognize that a peer has disappeared by simply detecting that there is no response within a certain time limit. Then, the redundancy peer is looked-up for identifying a fallback peer. The trick is now that this fallback peer, which might be a redundancy peer does not provide the requested service, but a service alternative. That is a service having an appropriate interface but providing a different functionality. This functionality acts like an exception handler a catches the exceptional situation. The service design is such that exceptional situations offer appropriate service alternatives.

An interesting feature of such a peer-to-peer service system is that a service or a peer can specify the alternative service itself, i.e. determine at runtime the alternative service or peer. Hence a peer is in the position to define a service fallback chain.

This technique is illustrated in advance by means of the Chord algorithm. Here the peers are arranged as an oriented ring with shortcuts, where the redundancy peer and also the fallback peer is a neighbor peer with respect to the ring.

If a successor ping in the ordered ring fails, the service peer detects that the peer is down or disappeared, and the service peer has to start the chosen service.

DETAILED DESCRIPTION OF THE DRAWINGS

Figure 1:
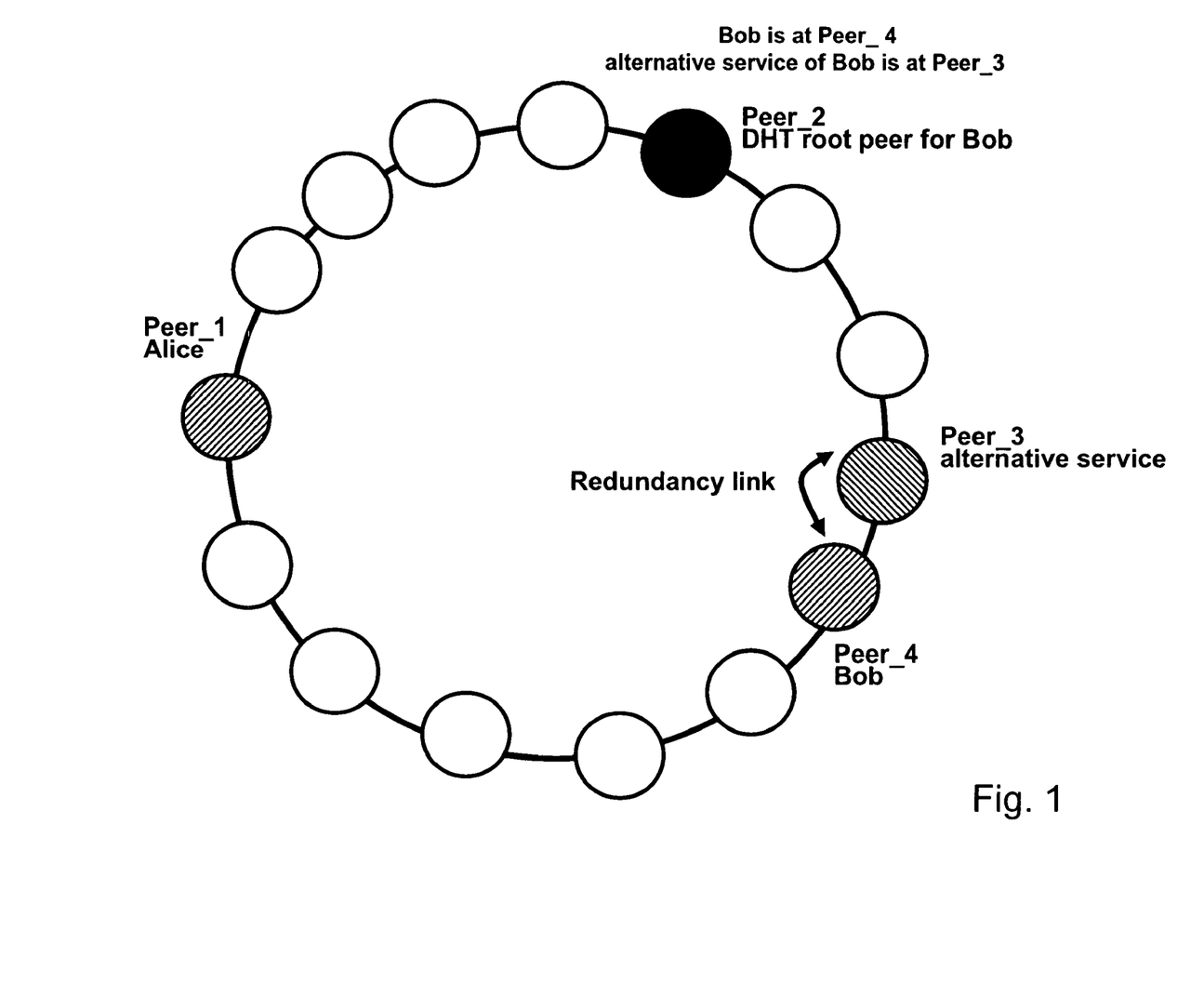
FIG. 1 shows a telecommunication system according to the invention with an additional alternative service (with an additional direct keep-alive)

Suppose the scenario shown in FIG. 1. There is a peer-to-peer system shown by the ring of circles, which are the peers. The peers comprise four certain peers:

A peer Peer_1 in the client role, called Alice.
A peer Peer_2 carrying the relevant part of a distributed hash table, called DHT_Peer.
A peer Peer_3 hosting a service.
A peer Peer_4, called Bob, hosting a service to be invoked by the client Alice.

The peer Peer_3 hosting the service is a neighbor of the peer Bob, hosting the service to be invoked by the client. The part of distributed hash table caries the resource location information, i.e. "Bob is at Peer_4, service of Bob is at Peer_3".

Figure 2:
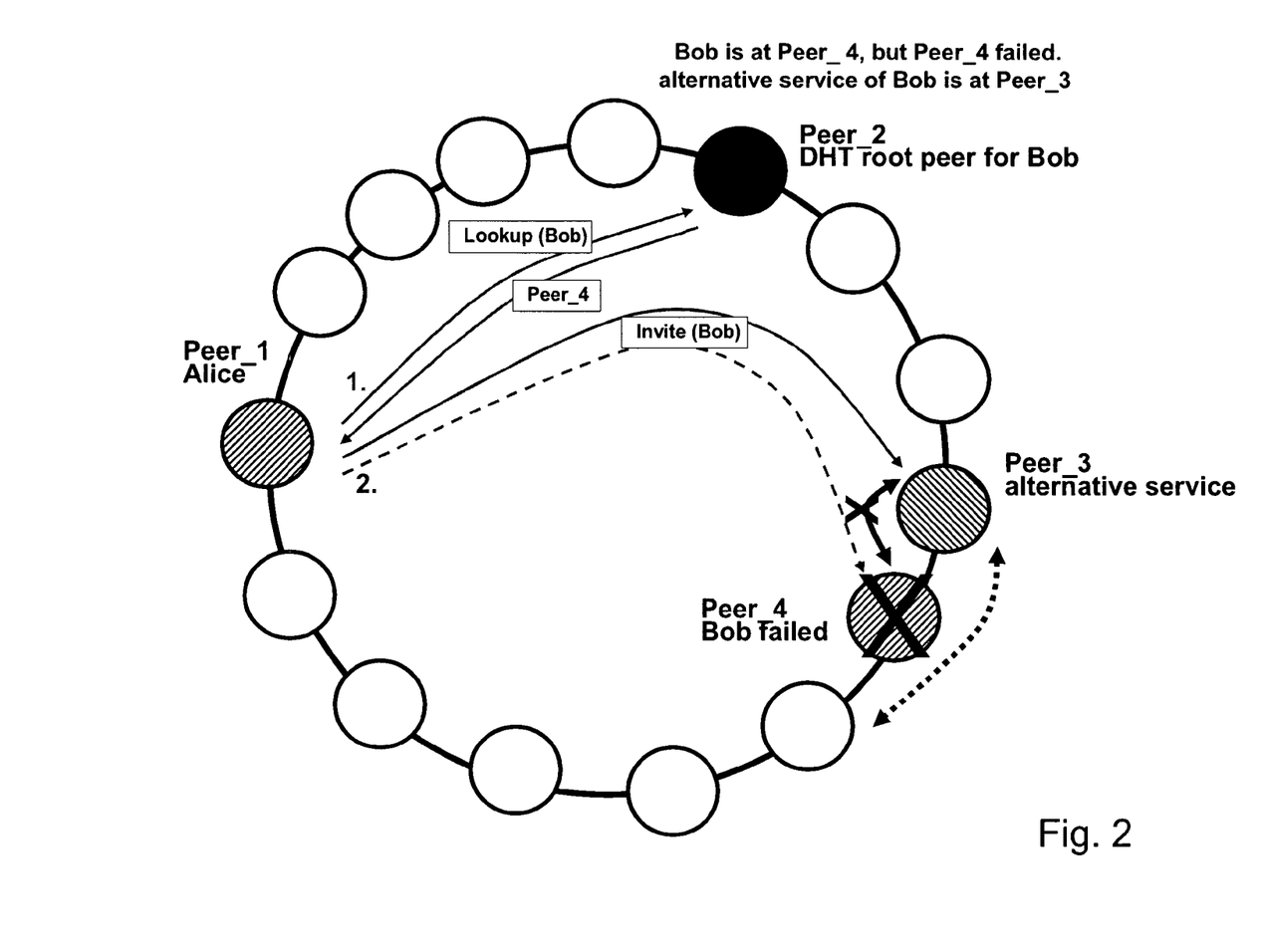
FIG. 2 illustrates the method of accessing an additional alternative service, according to the invention

FIG. 2 shows how a service invocation works. Suppose the peer Alice in the client role intends to reach the peer Bob hosting the requested service. The peer Bob hosting the requested service has disappeared from the peer-to-peer system shown by the X. Since the peer Alice in the client role is absolute unaware about the presence of the requested service. The peer-to-peer system provides a distributed dictionary that carries information to locate the requested service. That means in a first step the peer Alice in the client role causes a look up 1 in the dictionary for the requested service Bob. The peer Peer_4 hosting a service to be invoked by the client Alice. In advance the peer Peer_3 hosting an alternative service is identified, at least implicitly by a redundancy peer.

When the service Bob is invited or requested the peer-to-peer system becomes aware that the peer Peer_4 hosting this service is unavailable. But there is a catch, namely the peer Peer_3 hosting the alternative service. And this alternative service will be automatically invoked instead of invoking the originally requested service.

Figure 3:
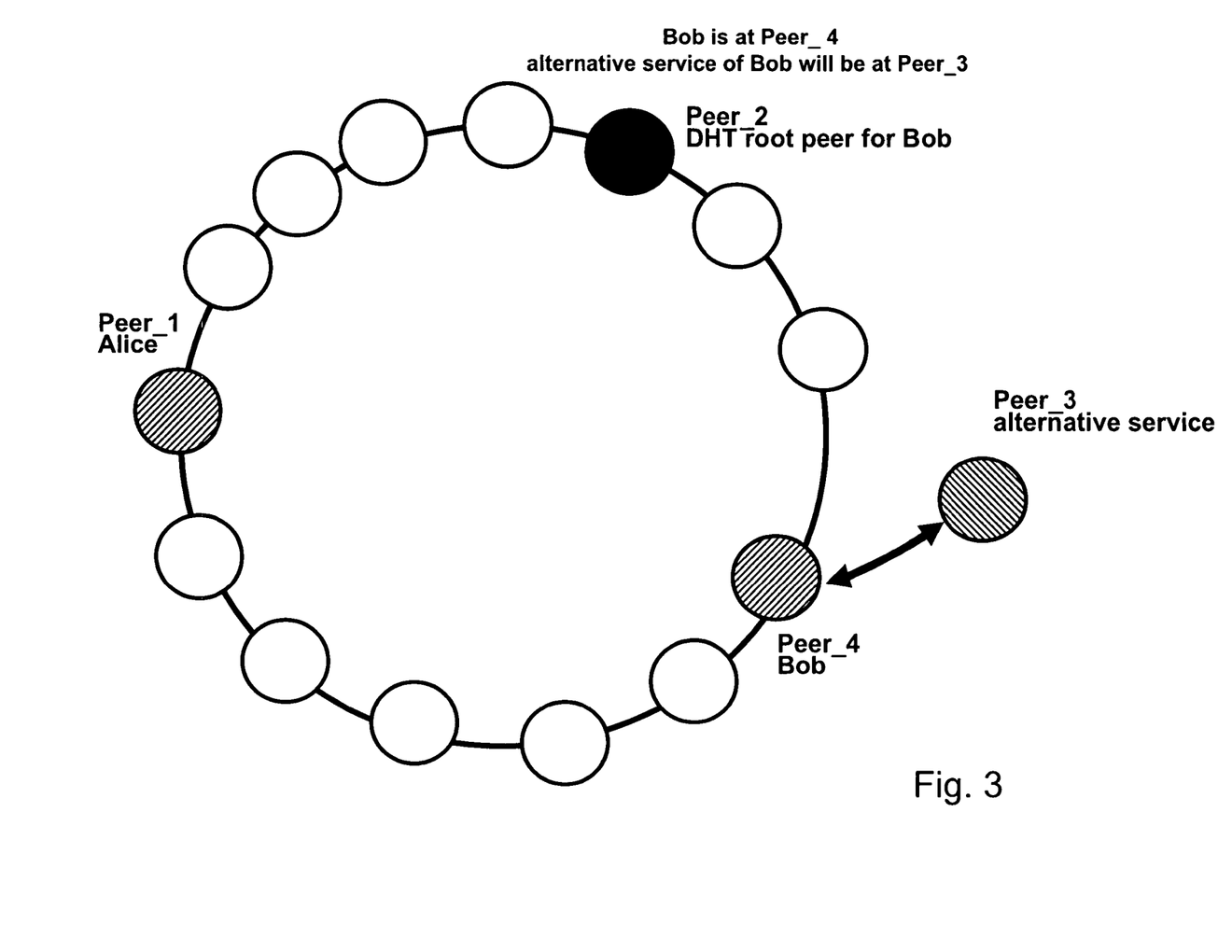
FIG. 3 shows a telecommunication method according to the invention with an additional direct keep-alive link

FIG. 3 shows how a peer Peer_3 hosting an alternative service is integrated into the peer-to-peer system. The peer Peer_4 hosting the service Bob should be enhanced by the fallback additional service hosted at a newly introduced peer Peer_3. The peer Peer_4 hosting the service Bob establishes direct keep-alive link. This is an independent link of the underlying peer-to-peer topology. This independent link is used to integrate the newly introduced peer Peer_3 at the right position into the peer-to-peer topology. In advance the peer-to-peer directory, here a distributed hash table, is updated by the entry indication the alternative service for the service Bob by simply patching the entry of the peer Peer_4 hosting the service Bob. It should be noted that this is indeed possible by this peer Peer_4, by simply looking up its own position and patching the entry.

Figure 4:
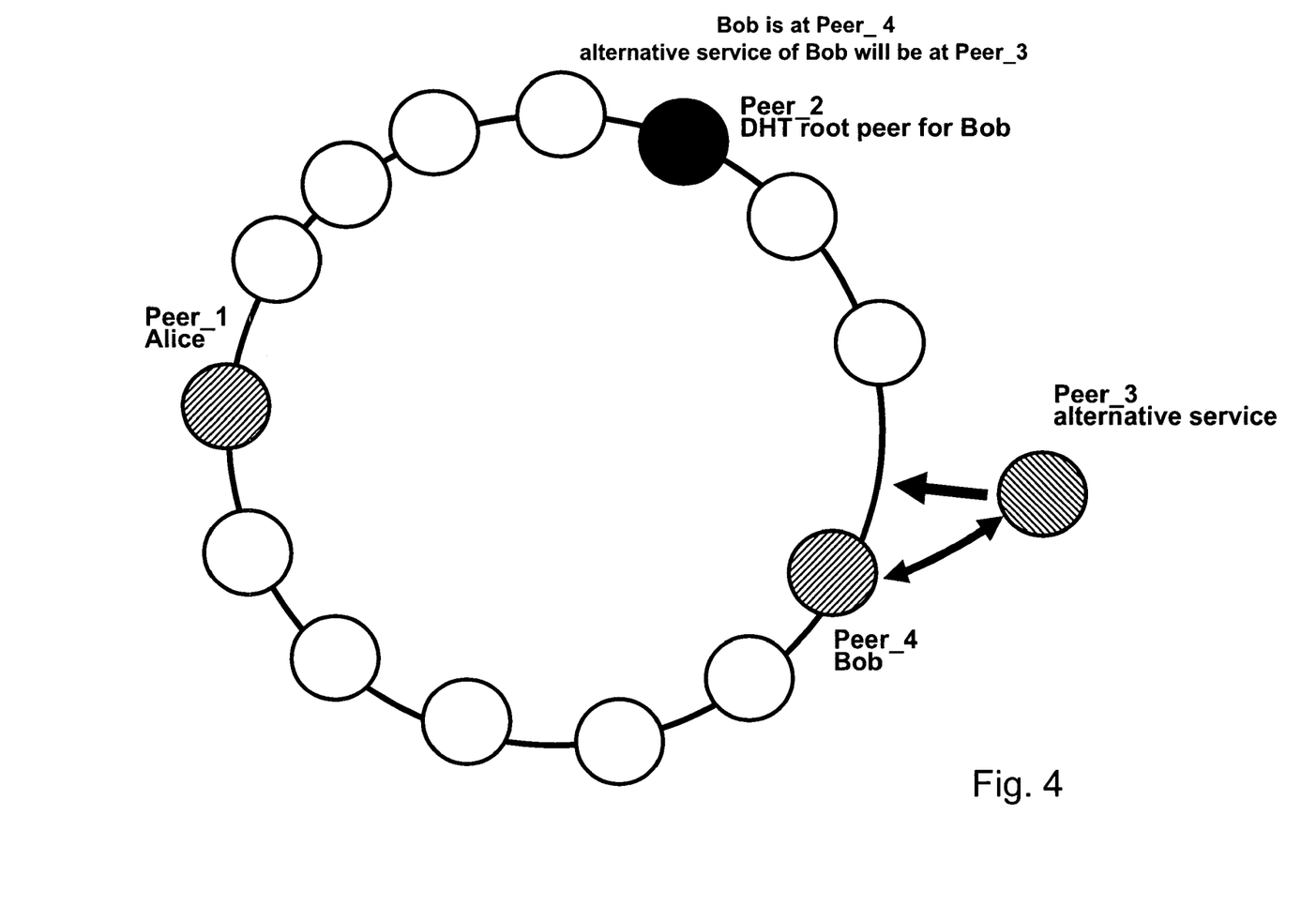
FIG. 4 shows the integration of a telecommunication service according to the invention

FIG. 4 shows the next step of the integration into the peer-to-peer topology. The peer Peer_3 hosting the alternative service joins previous to the peer Peer_4 hosting the service Bob to become a fallback service for service Bob, e.g. as soon as direct keep-alive ping crashes or as soon as the service Bob is unavailable. Thus arriving at the scenario shown in FIG. 2, where automatic routing of Alice's request will be inherently routed by means of the peer-to-peer system to the peer Peer_3 hosting the alternative service.

Figure 5:
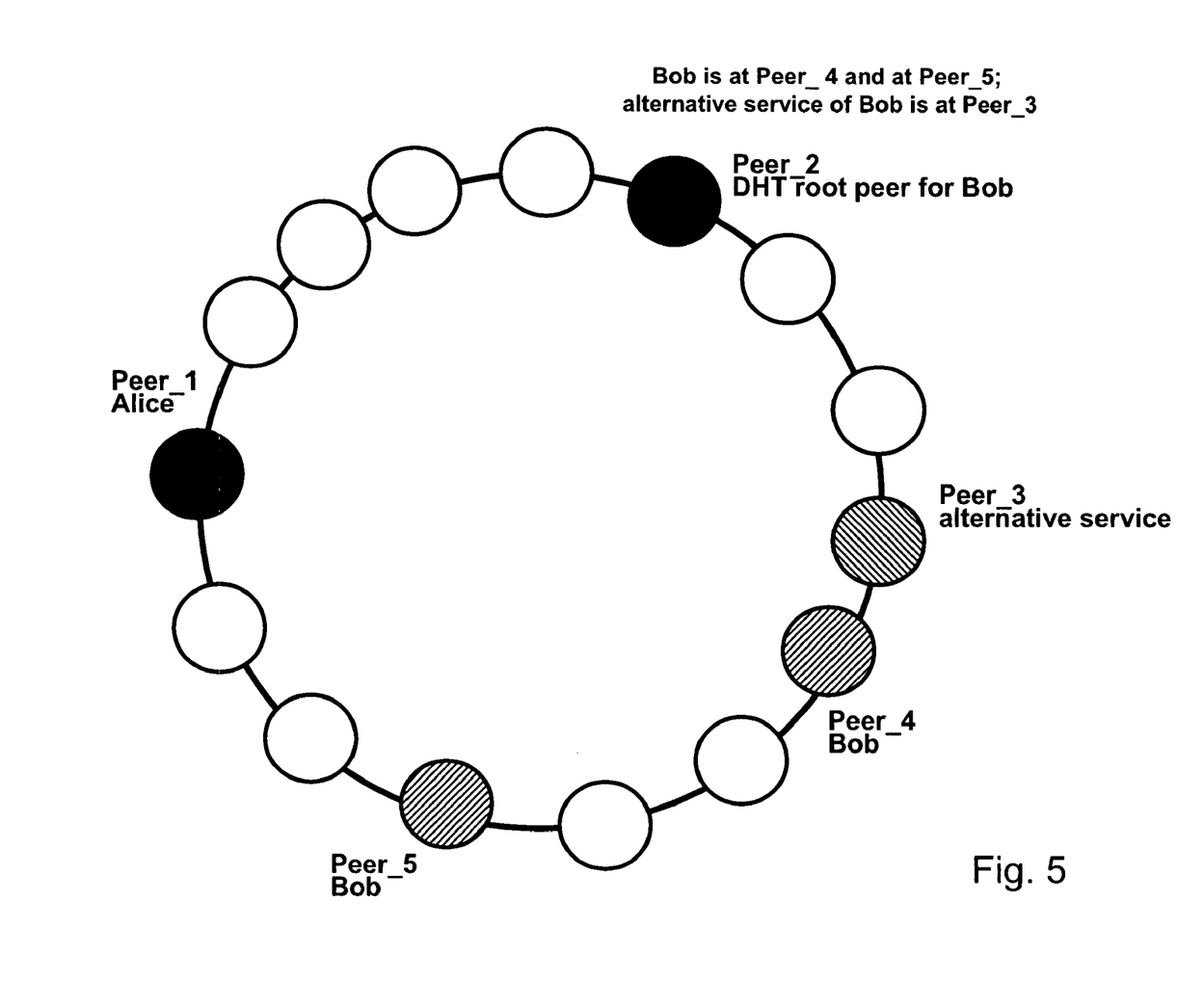
FIG. 5 shows telecommunication system according to the invention after the integration of a telecommunication system according to the invention

FIG. 5 illustrates that even when there are multiple instances of Bob service at different peers Peer_4 and Peer_5 each of the peers Peer_4 and Peer_5 has its own directory entry. Hence the service Bob could have different alternative services. In the shown example only the service Bob hosted on the peer Peer_4 has an alternative service, like shown and explained in the previous figures. The second instance of service Bob hosted on the peer Peer_5 has no alternative service as it could be inferred on the part of the distributed hashing table that is shown in the figure.

Figure 6:
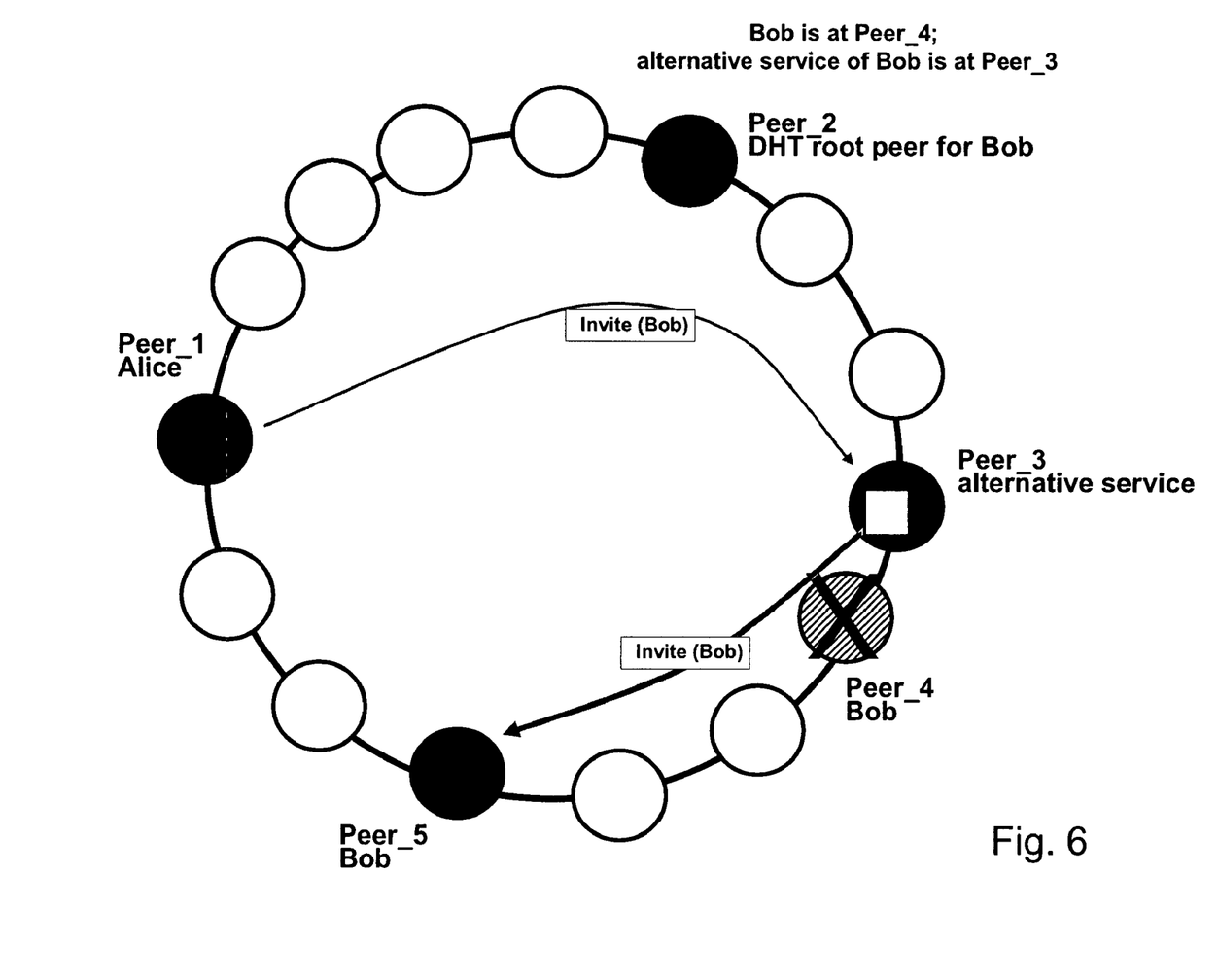
FIG. 6 shows the context of a service scenario in a telecommunication system according to the invention

FIG. 6 shows the configuration illustrated in FIG. 5 in action. The client Alice intends to invoke service Bob hosted on peer Peer_4. Peer_4 is disappeared but there is an alternative service hosted on peer Peer_3 that is available and the system catches this alternative service using the redundancy mechanism or an explicit entry in the dictionary. This alternative service could even, as illustrated refer to the service Bob hosted on peer Peer_5. That means the exception catching service could be used to delegate or forward invocations or to translate and convert service invocations.

For a telecommunication system where the peers correspond to end user appearances, i.e. communication clients, the alternative service could for instance forward a call to another chosen instance of Bob. Bob and Alice are in such a scenario representing the presence of a user.

Thus a user Bob that has his communication client not longer hosted on the peer Peer_4 could forward incoming calls to the Peer_4 by an alternative service comprising a script that determines Bob's presence and forwards the calls correspondingly.

In another application scenario the alternative service could for instance record the call by means of an answer machine implementation and could inform Bob by an instance message. So the user Alice can leave a message for Bob at a voice mailbox implemented by the alternative service and Bob gets an instant message for an incoming voice mail.

In the mentioned scenario an INVITE could not reach the service peer but the system compensates this by the alternative service that starts the voice mailbox of Bob. The successor ping is an inherent used mechanism by a peer-to-peer system, which can be used for starting a service. In all other peer-to-peer algorithms such "keep-alive" links can be reused.

It is even possible to realize the service outside the peer-to-peer environment. In case the service peer is not part of the peer-to-peer network, an additional keep-alive link independent of any peer-to-peer algorithm between service peer and peer has to be introduced. In such case the service peer checks always the keep-alive link and in case if it fails the service peer joins in this part of the ring where the crashed peer was located and then can start the service.

Thereby the service peer instance has not always to be present in the network like in the first case. A service instance is only needed when the service is needed. Services are for example to represent the user with a voice mailbox if the user is offline, or to decide which instance of a user should be called and therefore where should the call be routed. In other words a peer can have a service peer, which provides services, e.g. a voicemail service in case the peer is currently offline. Each peer stores its service peer location on its service peer bridge. A service peer bridge peer always contains one or more service peer location entries.

A service peer bridge peer in the context of session intitialitiazion protocol telecommunication applications can perform the bridging in at least three different ways: a proxy, a B2BUA, or a redirect module.

Figure 7:
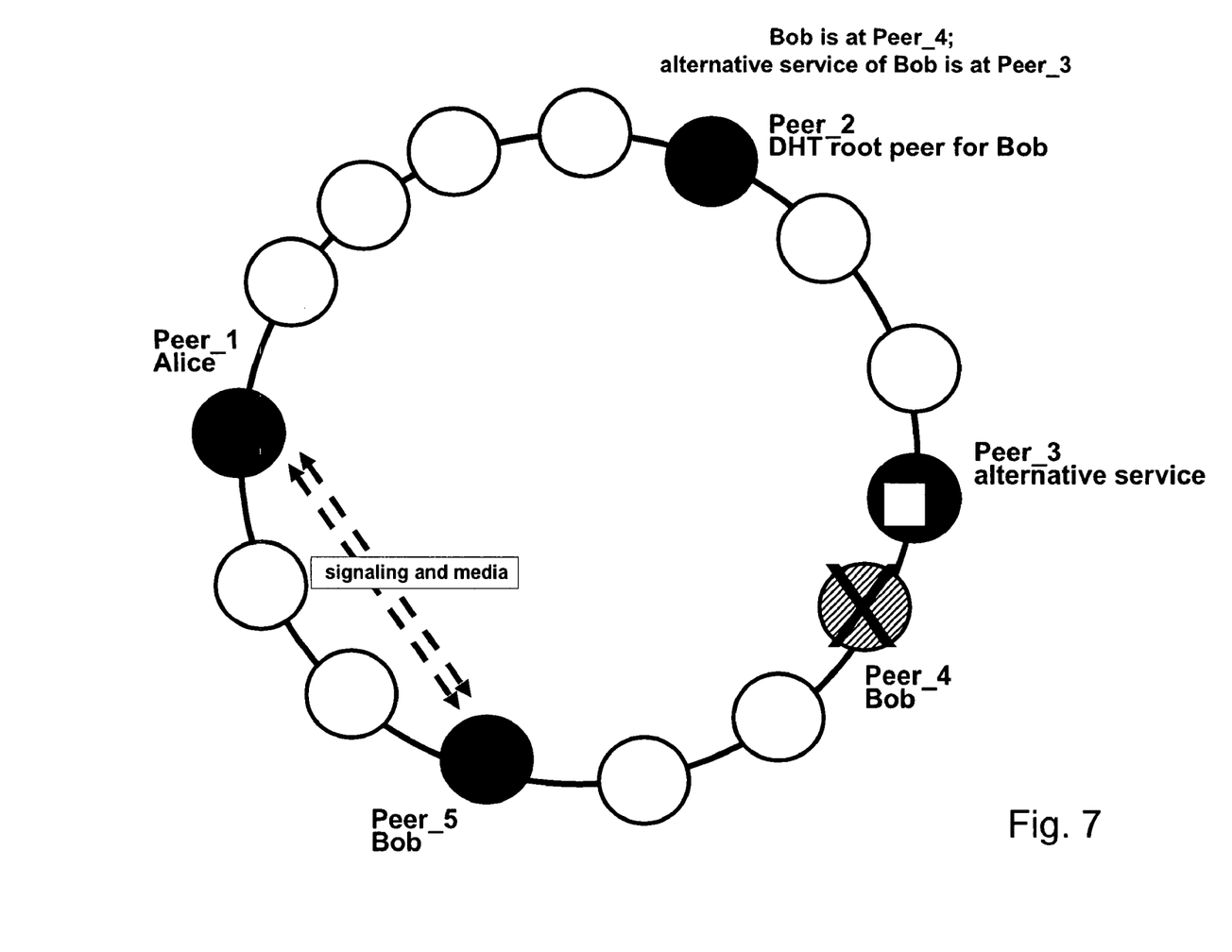
FIG. 7 shows a forwarding scenario by means of a proxy in a telecommunication system according to the invention

FIG. 7 shows as a preferred embodiment a service peer bridge with an indirection implementing a delegation mechanism. The example comprises a peer bridge that could redirect a call or session to the service peer instance where the services are provided and run by means of a proxy. This proxy is realized as alternative service Peer_3. It causes a direct signaling and media flow between the requesting peer Alice and the requested and redirected Peer Bob. Alternatively the signaling could also be handled by the peer providing the additional service Peer_3.

Figure 8:
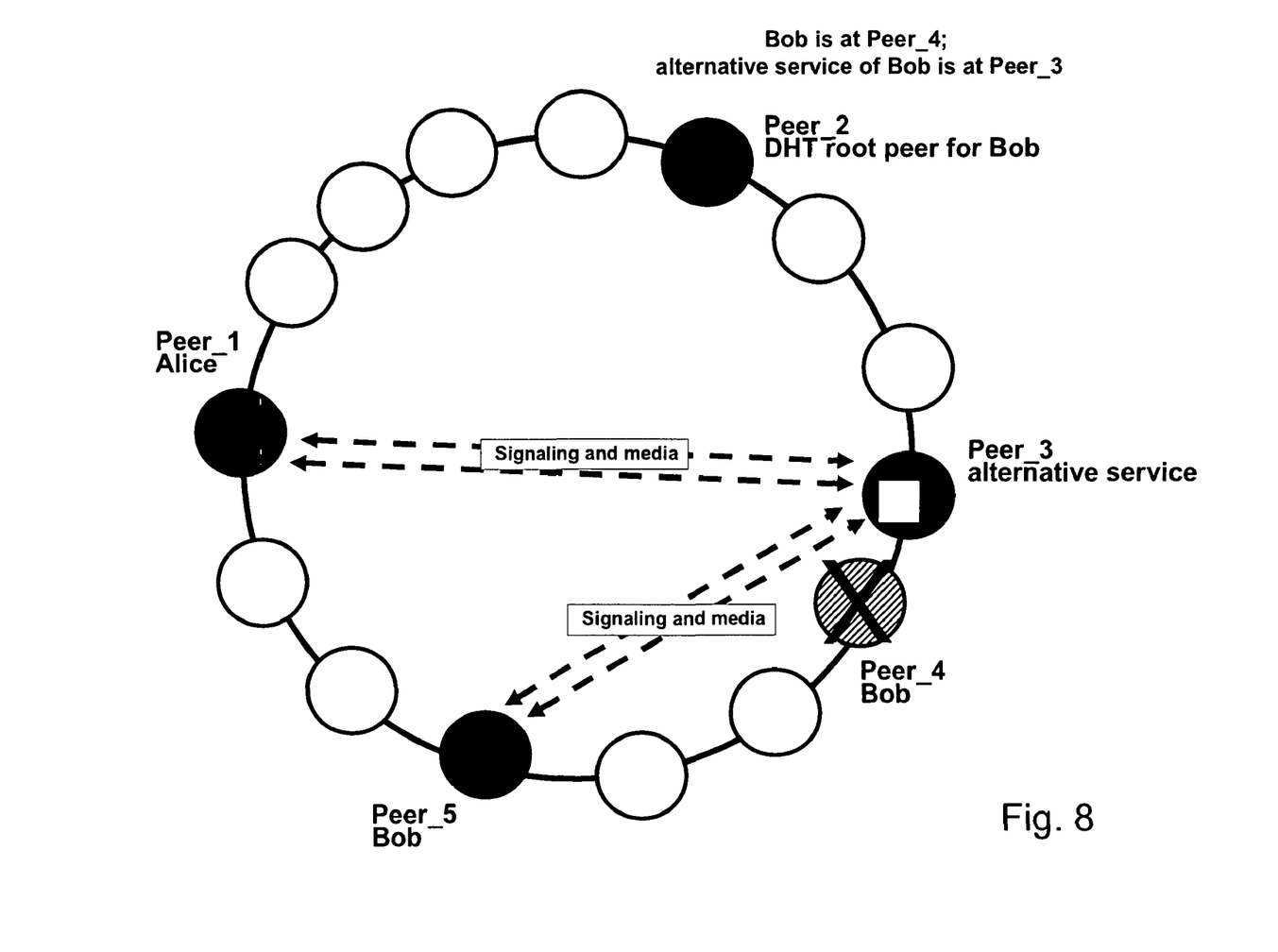
FIGS. 8 and 9 show a forwarding scenario by means of a back-to-back user agent (B2BUA) in a telecommunication system according to the invention
Figure 9:
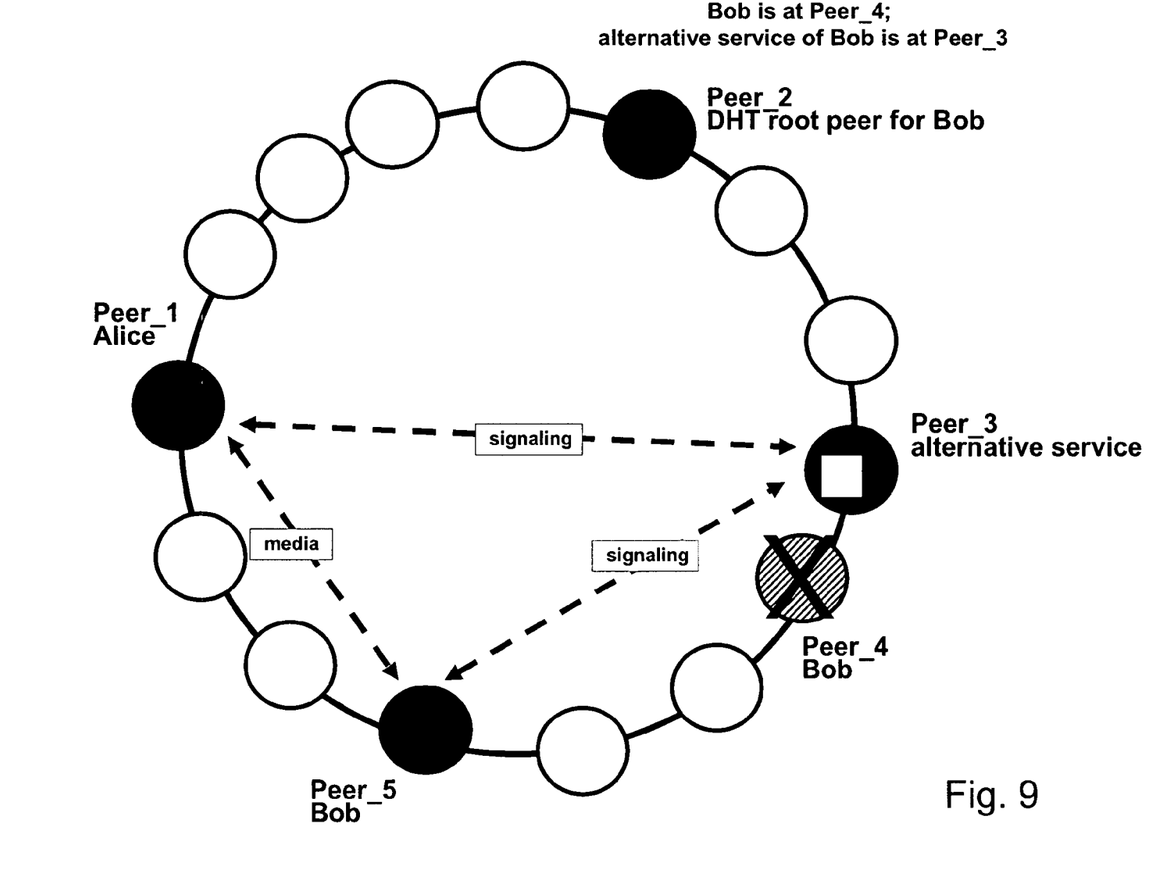

In a further preferred embodiment, shown in FIG. 8, the additional service peer Peer_3 acts as a B2BUA and hence terminating at least the signal flows, shown by dashed arrows, between the peers Alice and Bob. FIG. 9 shows an alternative scenario, where the alternative service Peer_3 terminates the signaling, only and not the media path.

Figure 10:
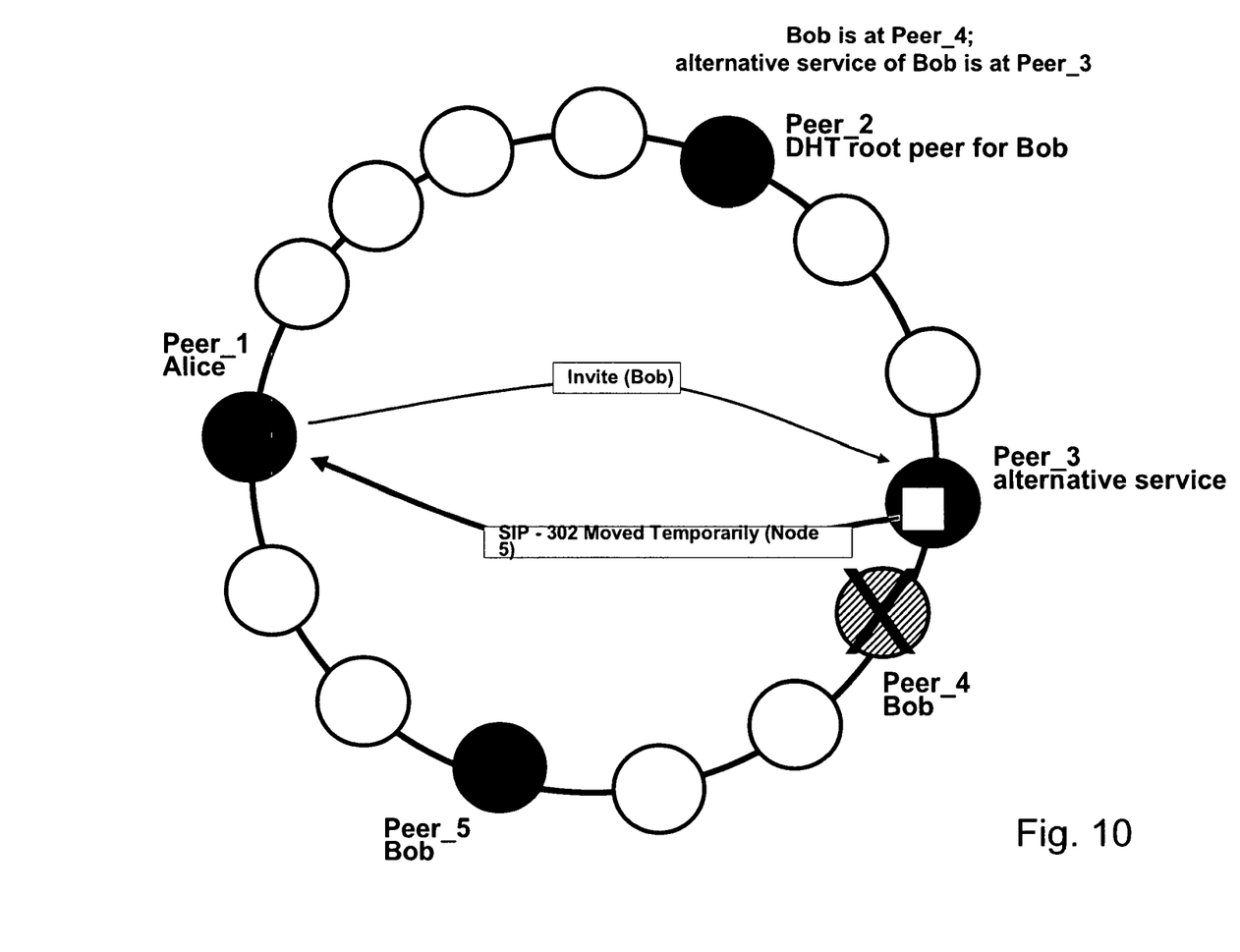

FIG. 10 shows a scenario where the alternative service Peer_3 implements a redirect module, which could be used, that acts as a stateless/stateful proxy, which redirects the call to the service peer. Afterwards can either stay in the signaling path or not. In this scenario the alternative peer informs the calling peer Alice about the presence(s) of the peer Bob.

In contrast the back-to-back user agent (B2BUA) or the proxy could be used without additional meta signaling, i.e. signaling concerning the peer hosting etc. A redirect module necessarily returns a kind of MOVED TEMPORARILY message.

Figure 11:
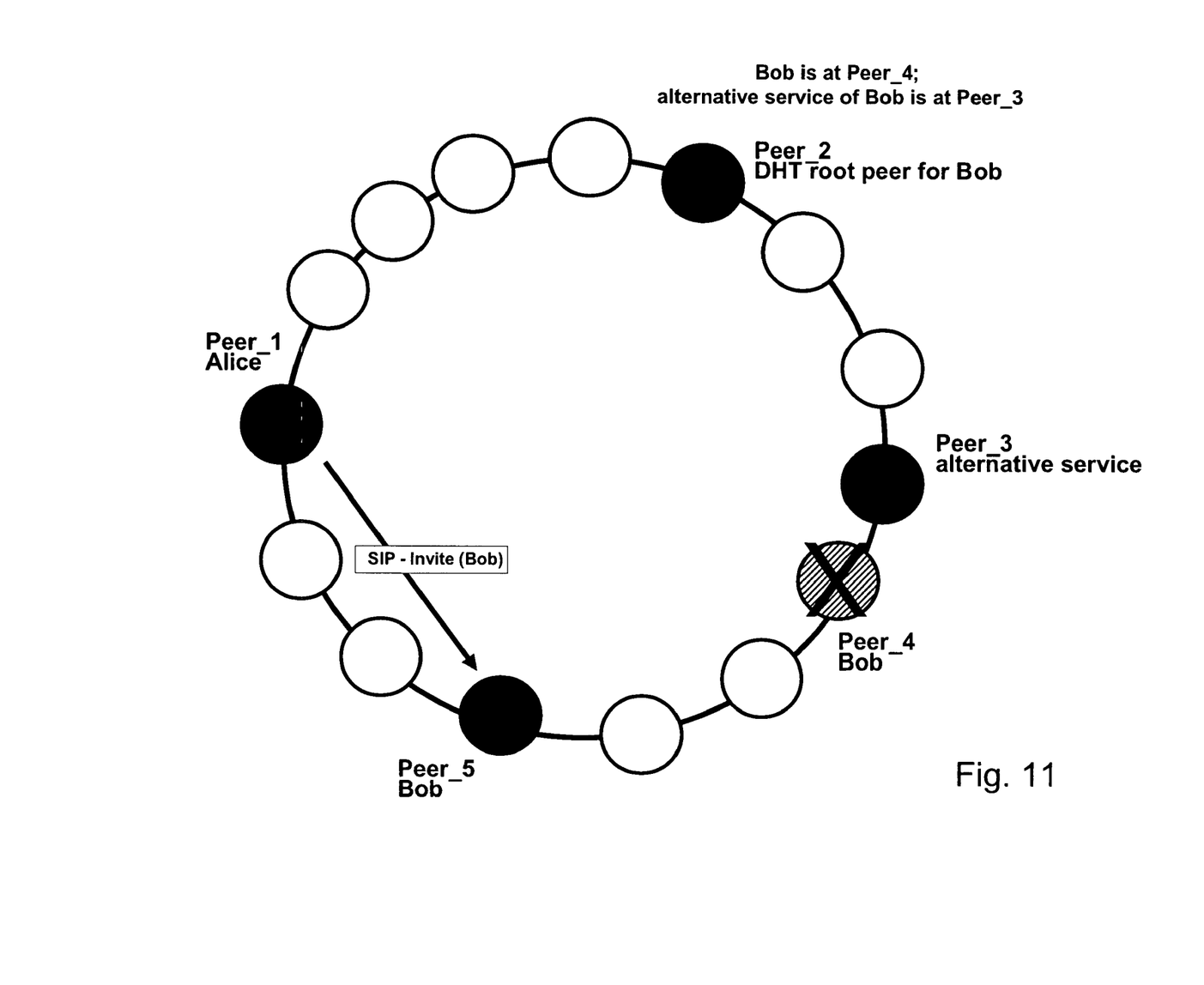
Figure 12:
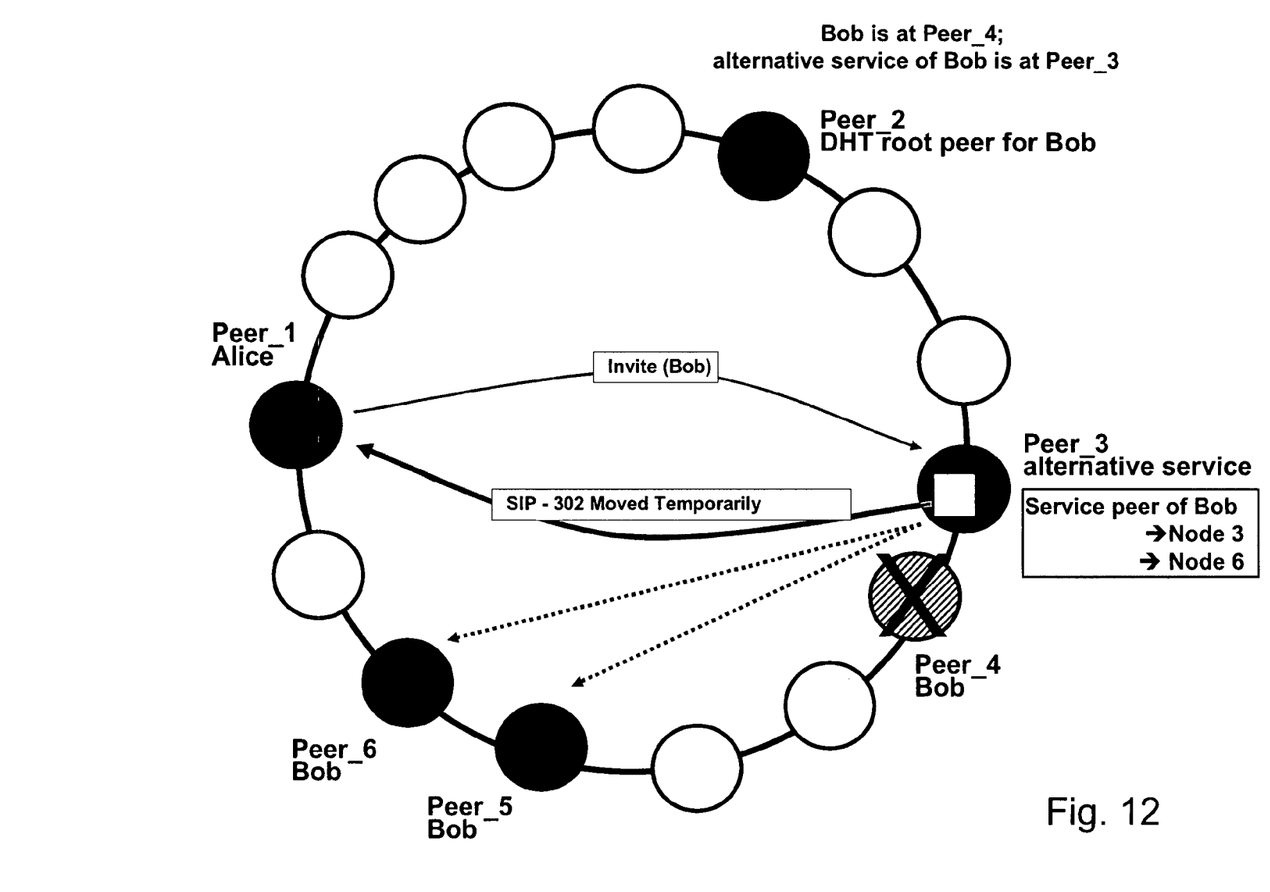
Figure 13:
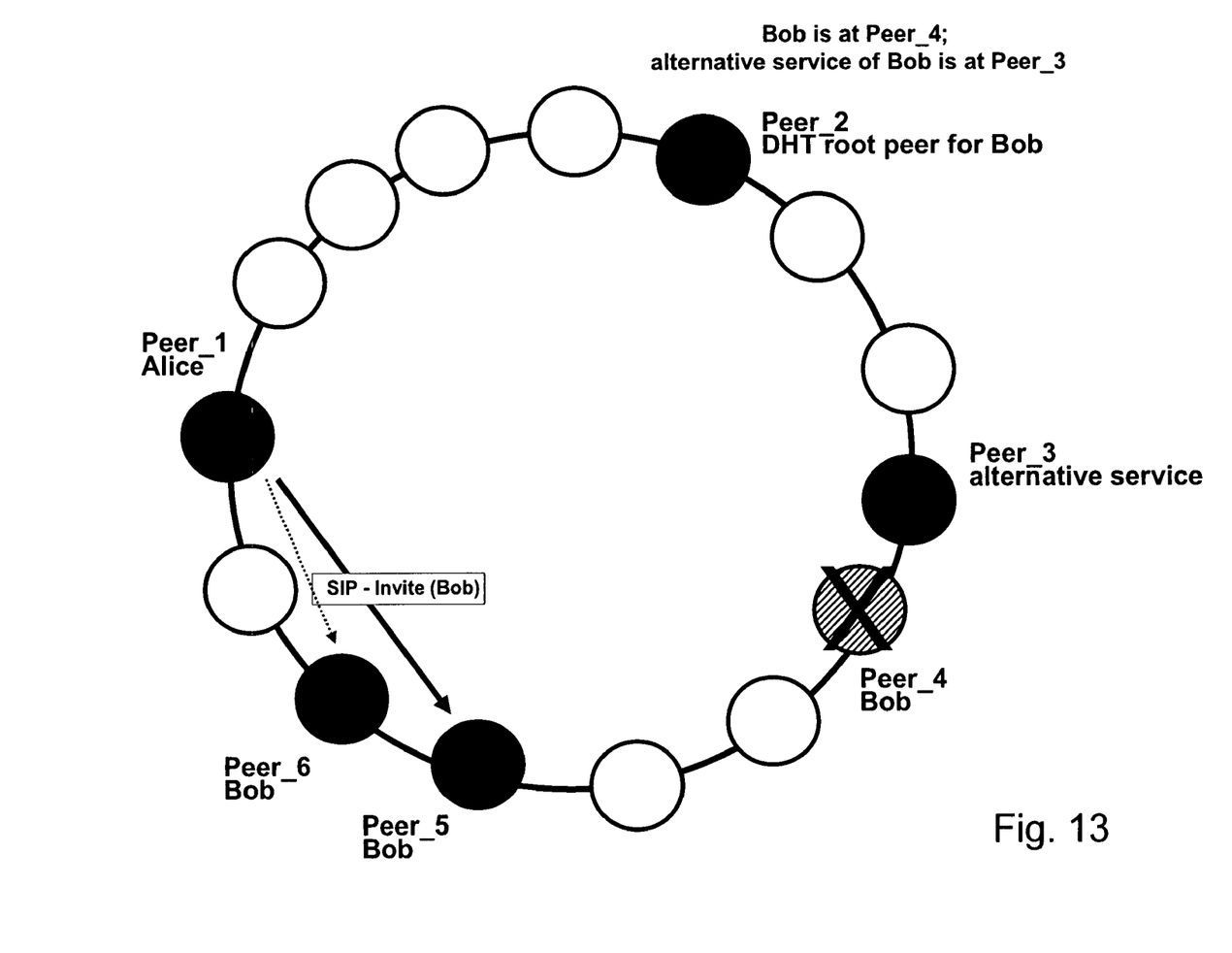

This message as shown in FIG. 11 enables the calling peer Alice to invoke the peer really hosting Bob. The advantage of this indirection is that the calling peer is enabled to make a choice between multiple presence of Bob as shown in FIGS. 12 and 13.

The invention claimed is:

1. A computer-executable method, stored on a non-transitory computer-readable medium, for invoking a communication service provided by a peer of a peer-to-peer system, the method comprising:
    identifying a peer hosting the communication service;
    invoking the communication service via a distributed directory that carries entries that enable a client to invoke the communication service; and
    identifying an alternative peer hosting an alternative communication service in case the identified peer or the communication service is unavailable, where the alternative communication service has an interface and provides a functionality different from said communication service, and where the distributed directory carries entries that enable a client to invoke the alternative communication service.

2. The method according to claim 1, wherein the alternative service is hosted on an redundant peer and identified by a redundancy component of the distributed directory.

3. The method according to claim 1, wherein the alternative service is invoked transparently for the client.

4. The method according to claim 1, wherein the alternative service delegates to another peer.

5. A non-transitory computer software product, stored on a non-transitory computer-readable medium, for providing communication services via a peer of a peer-to-peer programming system, the peer-to-peer programming system comprising a distributed directory for identifying a peer hosting a communication service and a communication component for invoking the communication service, where the distributed directory carrying entries that enable a client to invoke the communication service, wherein the peer-to-peer programming system comprises an identification component for identifying an alternative peer hosting an alternative communication service in case the peer or the communication service is unavailable, where the alternative communication service has an interface and provides a functionality different from said communication service, and wherein the distributed directory carries entries that enable a client to invoke the alternative communication service.

6. The computer software product according to claim 5, wherein the alternative service is hosted on an redundant peer and identified by redundancy component of the distributed directory.

7. The computer software product according to claim 5, wherein the peer-to-peer programming system is adapted to invoke the alternative service transparently for the client.

8. The method according to claim 5, wherein the alternative service delegates to another peer.

9. A telecommunication system for providing communication services a peer of a peer-to-peer programming system, where the peer-to-peer programming system comprises a distributed directory for identifying a peer hosting a communication service and where the peer-to-peer programming system comprises a communication component for invoking the communication service, where the distributed directory carrying entries that enable a client to invoke the communication service, wherein the peer-to-peer programming system comprises an identification component for identifying an alternative peer hosting an alternative communication service in case the peer or the communication service is unavailable, where the alternative communication service has an interface and provides a functionality different from said communication service, and wherein the distributed directory carries entries that enable a client to invoke the alternative communication service.

10. The telecommunication system according to claim 9, wherein the alternative service is hosted on an redundant peer and identified by redundancy component of the distributed directory.

11. The telecommunication system according to claim 9, wherein the peer-to-peer programming system is adapted to invoke the alternative service transparently for the client.

12. The telecommunication system according to claim 9, wherein the alternative service delegates to another peer.

13. A telecommunication service system for providing a communication service via a peer of a peer-to-peer programming system, where the peer-to-peer programming system comprises a distributed directory for identifying a peer hosting a communication service and where the peer-to-peer programming system comprises a communication component for invoking the communication service, where the distributed directory carrying entries that enable a client to invoke the communication service, wherein the peer-to-peer programming system comprises an identification component for identifying an alternative peer hosting an alternative communication service in case the peer or the communication service is unavailable, where the alternative communication service has an interface and provides a functionality different from said communication service, and wherein the distributed directory carries entries that enable a client to invoke the alternative communication service.

14. The telecommunication service system according to claim 13, wherein the alternative service is hosted on an redundant peer and identified by redundancy component of the distributed directory.

15. The telecommunication service system according to claim 13, wherein the peer-to-peer programming system is adapted to invoke the alternative service transparently for the client.

16. The telecommunication service system according to claim 13, wherein the alternative service delegates to another peer.

* * * * *